(12) United States Patent
Serschen

(10) Patent No.: US 8,240,094 B1
(45) Date of Patent: Aug. 14, 2012

(54) BIRD DEFENSE DEVICE

(76) Inventor: Robert Serschen, Traverse City, MI (US)

( * ) Notice: Subject to any disclaimer, the term of this patent is extended or adjusted under 35 U.S.C. 154(b) by 0 days.

(21) Appl. No.: 13/068,706

(22) Filed: May 18, 2011

(51) Int. Cl.
*E04H 9/16* (2006.01)

(52) U.S. Cl. .................. 52/101; 248/228.6; 248/231.71; 119/903

(58) Field of Classification Search .................... 256/11, 256/12; 248/228.6, 230.6, 231.71; 119/903; 52/101
See application file for complete search history.

(56) References Cited

U.S. PATENT DOCUMENTS

| | | | | |
|---|---|---|---|---|
| 589,261 A * | 8/1897 | Rehm | ............................ | 248/514 |
| 2,522,255 A * | 9/1950 | Climo | ............................ | 43/21.2 |
| 2,828,096 A * | 3/1958 | Beri | ................................ | 43/21.2 |
| 3,289,217 A * | 12/1966 | Glover | ............................ | 4/562.1 |
| 3,839,824 A * | 10/1974 | Ellis et al. | ........................ | 49/34 |
| 4,059,248 A * | 11/1977 | Kuntz | ............................ | 248/214 |
| 4,270,721 A * | 6/1981 | Mainor, Jr. | ................. | 248/285.1 |
| 5,149,036 A * | 9/1992 | Sheehan | ....................... | 248/215 |
| 6,585,233 B1 * | 7/2003 | Sorben | ............................ | 256/12 |
| 7,780,132 B1 * | 8/2010 | Tomaric | ........................ | 248/317 |
| 2005/0189529 A1 * | 9/2005 | Humphreys et al. | ............ | 256/12 |

* cited by examiner

*Primary Examiner* — Robert Canfield
*Assistant Examiner* — Brent W Herring
(74) *Attorney, Agent, or Firm* — Robert L. McKellar; McKellar IP Law, PLLC

(57) ABSTRACT

A bird defense system for a dock system. The bird defense system consists of a series of support arms that are mounted to the stringers of the dock. The support arms are manually attached to the stringer and have an adjustable height support rod that allows the user to set the height of the bird defense system. At the end of the support rods are hollow tubes that accommodate a cord that is threaded through each support arm creating a perimeter around the dock preventing birds from landing or hoping on the top surface of the dock.

6 Claims, 7 Drawing Sheets

US 8,240,094 B1

BIRD DEFENSE DEVICE

BACKGROUND OF THE INVENTION

The inventive device disclosed and claimed herein is a bird defense system. It has been discovered that when deployed the system prevents birds from landing on a dock or docking system. The device consists of a series of support rods that are anchored to the dock that have a cord or wire that produces a barrier and prevents landing or perching.

Birds or more specifically ducks and seagulls will land near or on docks to roost. The birds have a tendency to land in the water nearby and then hop onto the adjacent dock. It has been discovered that when the cord or wire is set at a specific height the birds cannot make the hopping maneuver and therefore cannot land on the dock and move on.

THE INVENTION

The instant invention is a bird defense device. The device is comprised of a base which has a cross member, wherein the cross member is common to a first leg. The first leg is located at one end of the cross member and fixedly attached to it. The first leg has a first threaded opening through it. The first leg also has a first threaded fastener positioned in a first threaded opening. The device also has a second leg. The second leg is located at the end of the cross member opposite the first leg. The second leg is fixedly attached to the cross member such that the cross member, the first leg and the second leg form a U-shaped configuration that has an interior open space. The second leg has a second threaded opening through it. This second leg has a large opening essentially centered through the long axis thereof. There is a support rod positioned in the large opening. This support rod is moveable through the opening. The support rod has a top end. The second leg has a second fastener positioned in the second threaded opening to secure the support rod therein. There is also a hollow tube component fixedly attached to the top end of the support rod such that the hollow of the hollow tube is essentially perpendicular to the long axis of the support rod.

DETAILED DESCRIPTION OF THE DRAWINGS

Figure 1:
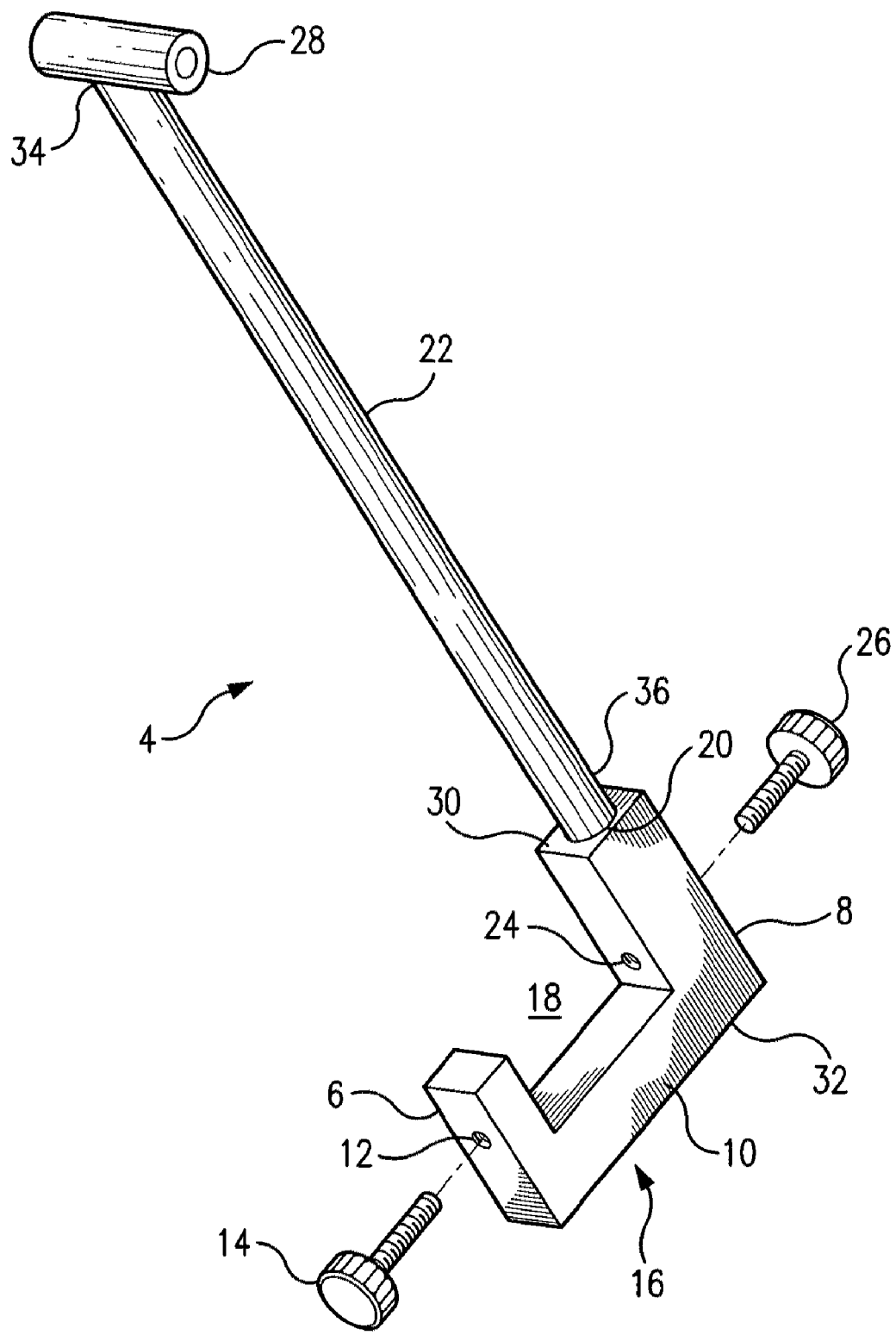
FIG. 1 is a view in perspective of the support device of the bird defense system.

FIG. 1 is a perspective view of the support arm 4 of the bird defense system 2. This support arm 4 is designed to attach to a standard docking system. The support arm 4 has a first leg 6, a cross member 10 and a second leg 8 forming a U-shaped configuration 16. This U-shaped configuration 16 is designed to be clamped to a stringer 46 (See FIG. 5) of a dock. The first leg 6 has a first threaded opening 12 that receives a first threaded fastener 14. This first threaded fastener 14 secures the support arm 4 to the dock stringer 46. The stringer 46 sits in the interior open space 18. The second leg 8 has a large opening 20 that runs from the top 30 to the bottom 32. This large opening 20 receives the support rod 22.

The support rod 22 is adjustable within the large opening 20. The adjustability is managed through the second threaded opening 24 and the second threaded fastener 26. The support rod 22 is placed at the appropriate height by the user then the second threaded fastener 26 is tightened in the second threaded opening 24 securing the height of the support rod 22 by the user. The support arm 22 has a near end 34 and a distal end 36. The hollow tube 28 is located at the distal end 3 while the near end 34 is inserted into the large opening 20 of the second leg 8.

Figure 2:
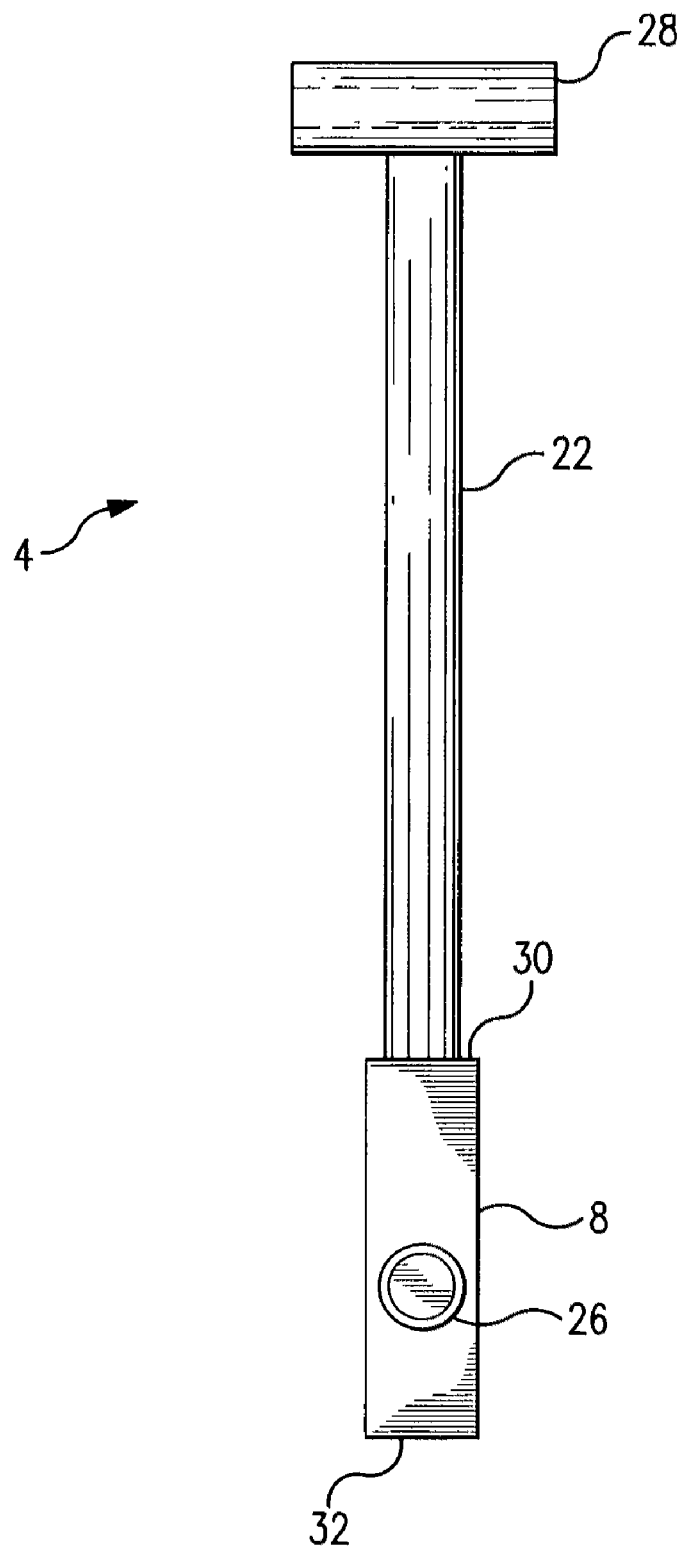
FIG. 2 is a rear view of the support device of FIG. 1.

FIG. 2 is a back view of the support arm 4 of the bird defense system 2. This Figure shows the support arm 4 and the hollow tube 28. The support rod 22 is shown as well as the second threaded fastener 26. The second threaded fastener 26 is located on the second leg 8. Again this second threaded fastener 26 is the adjustability management control for the height of the support rod 22 of the support arm 4. The second threaded fastener 26 is loosened and the support rod 22 slides either upward or downward depending on the height selected by the user.

Figure 3:
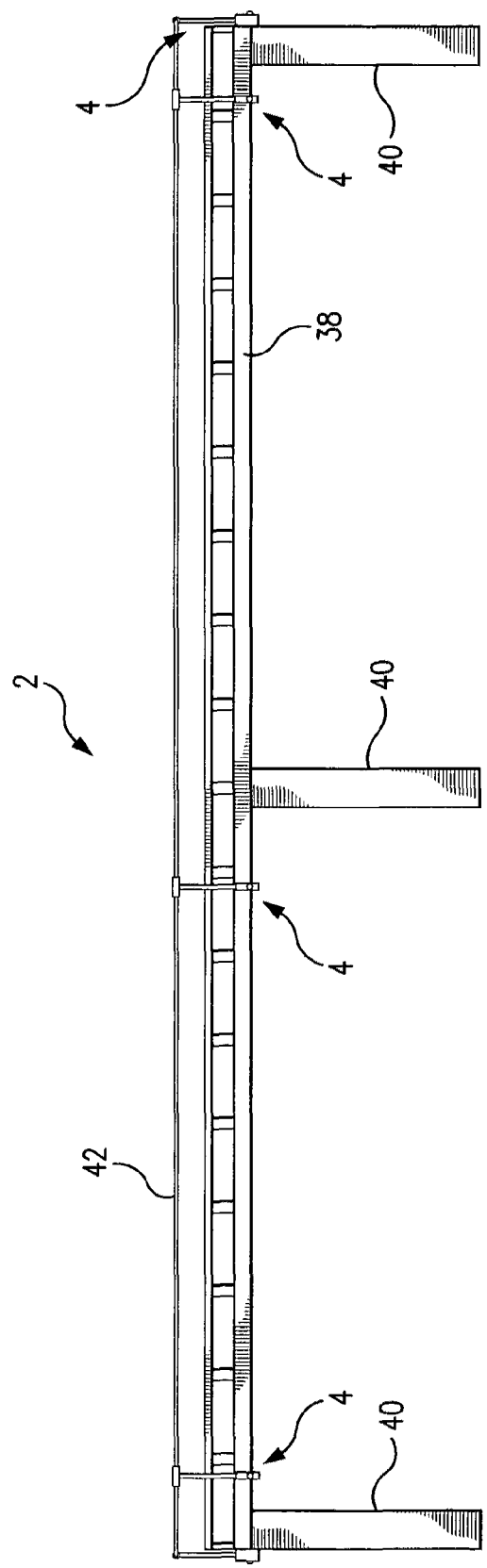
FIG. 3 is a side view of the bird defense system of FIG. 1, deployed on a docking system.

FIG. 3 is a side view of the bird defense system 2 deployed on a docking system 44. This Figure shows the components of the docking system 44. These components consist of the dock 38 and the dock supports 40. Docks are commonly manufactured in a manner where the top surface is supported by a series of stringers, which are metal or wood. These components are of various sizes, typically reflecting standard size building materials. The bird defense system 2 consists of the support arms 4 and a cord 42 that is supported by the support arms.

Figure 4:
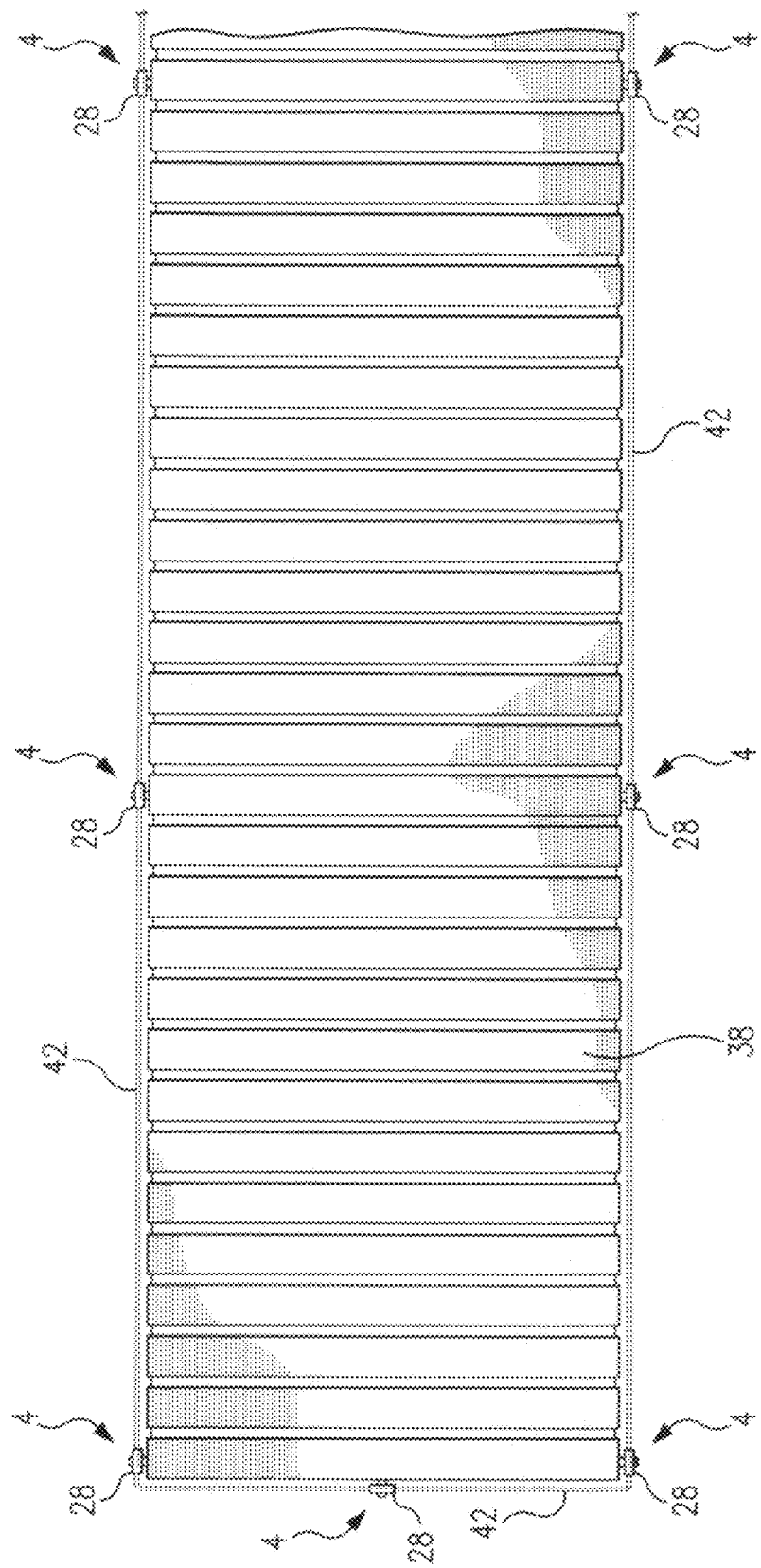
FIG. 4 is a top view of the bird defense system deployed on a docking system.

FIG. 4 is a top view of the bird defense system 2 deployed on a docking system 44. This view shows the support arms 4 around the perimeter of the dock 38. The cord 42 is passed through the hollow tube 28 of each of the support arms 4. This forms a perimeter that prevents the birds from landing or hoping onto the dock 38.

Figure 5:
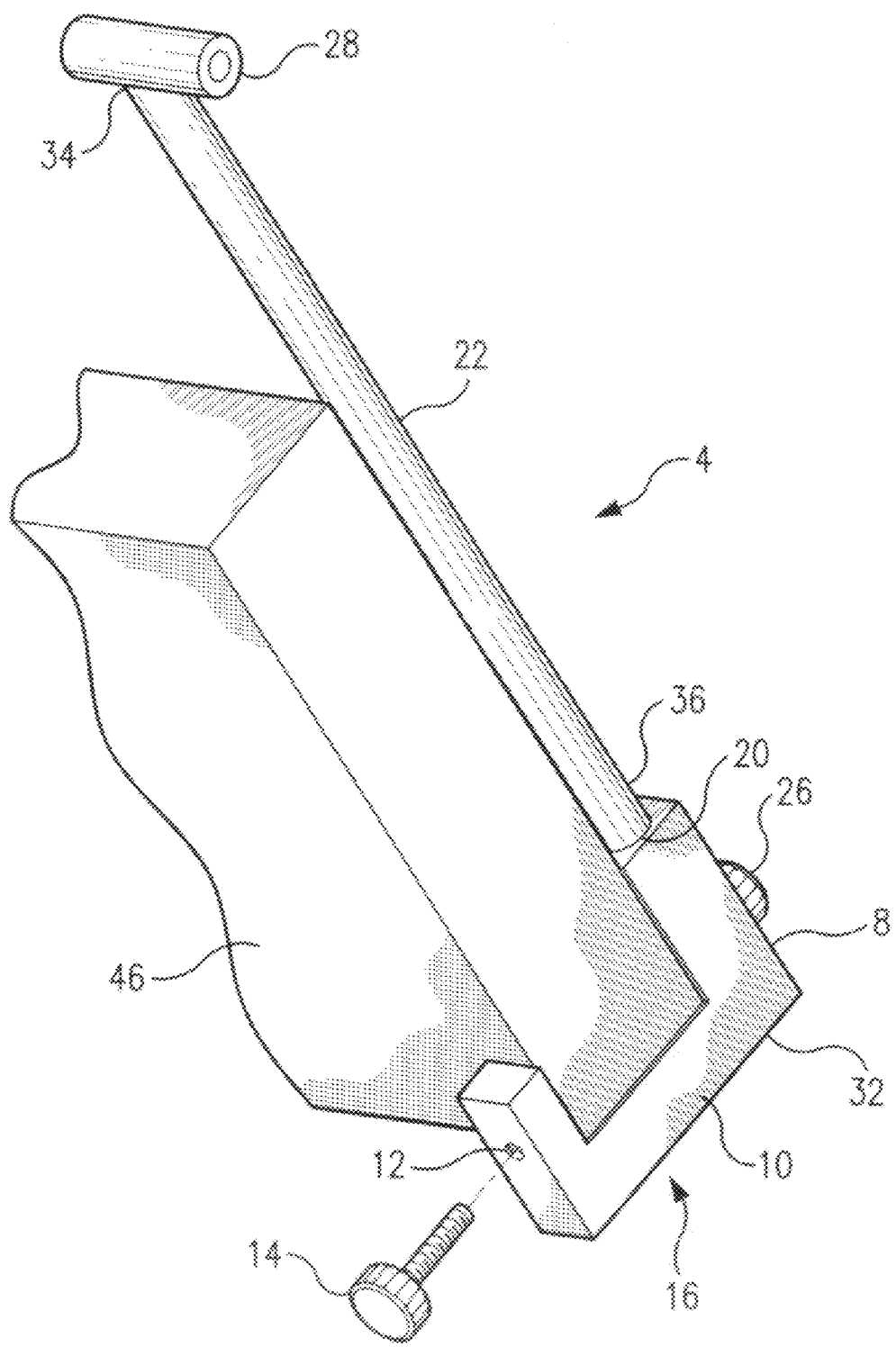
FIG. 5 is a view in perspective of the support device of the bird defense system with a stringer in place.

FIG. 5 is a perspective view of the support arm 4 of the bird defense system 2 with a stringer 46 attached. As described earlier the docking system consists of components including the dock with a top surface 48, and stringers or side rails 46. This Figure shows how the support arms 4 of the bird defense system 2 attach to the stringer 46 of the dock 38. The first threaded opening 12 has a first threaded fastener 14 that is inserted into the first threaded opening 12 and tightened to secure the support arm 4 to the stringer. This process is repeated until the support arms surround the perimeter of the docking system 44.

Figure 6:
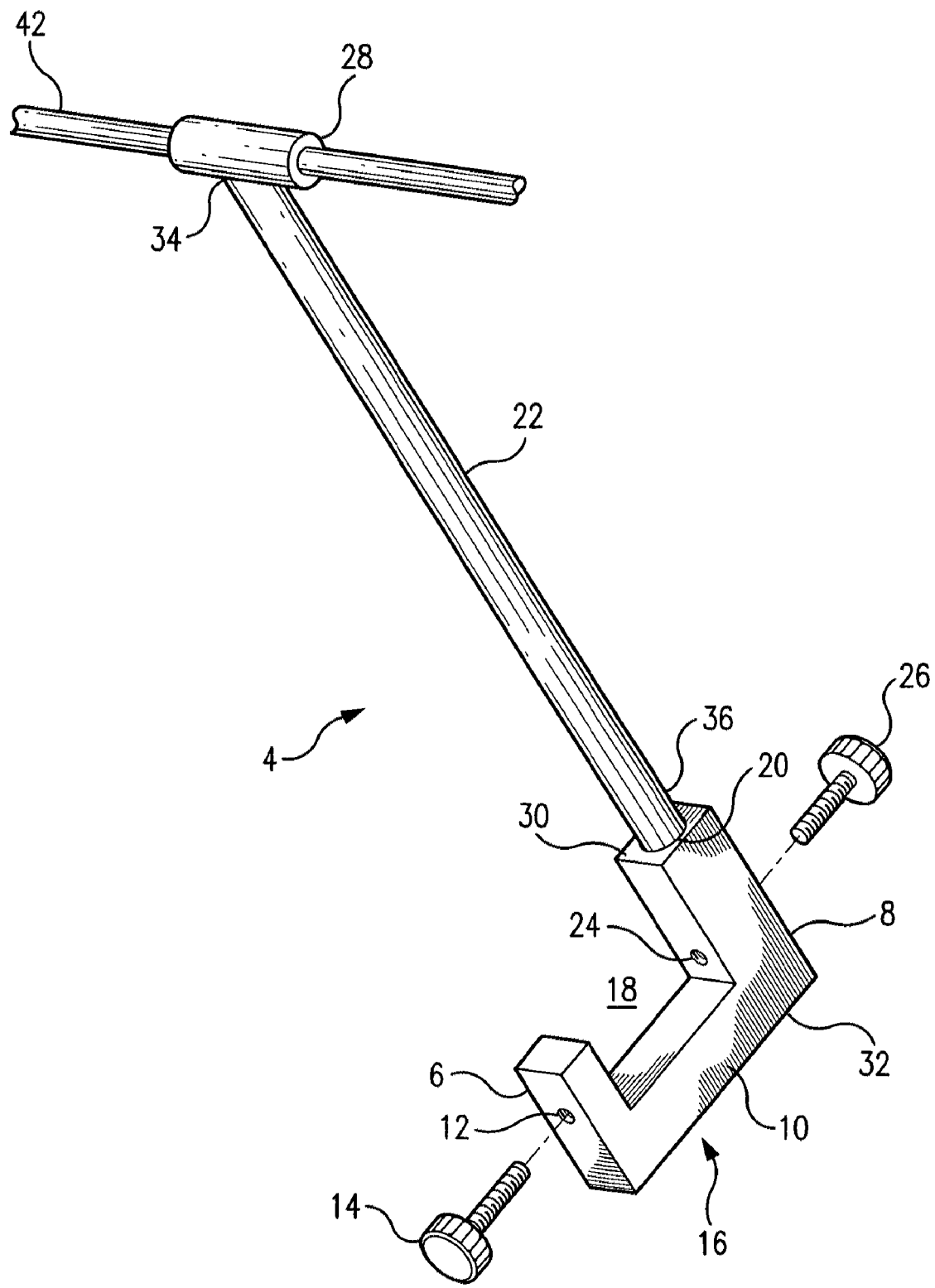
FIG. 6 is a view in perspective of the support device of the bird defense system with a cord in the hollow tube of the support of the device.

FIG. 6 is a perspective view of the support arm 4 of the bird defense system 2 with a cord 42 in the hollow tube 28 of the support arm 4. Once the perimeter is surrounded with the support arms the cord is passed through the hollow tube 28 of each support arm 4 creating a perimeter above the top surface 48 of the dock system 44.

Figure 7:
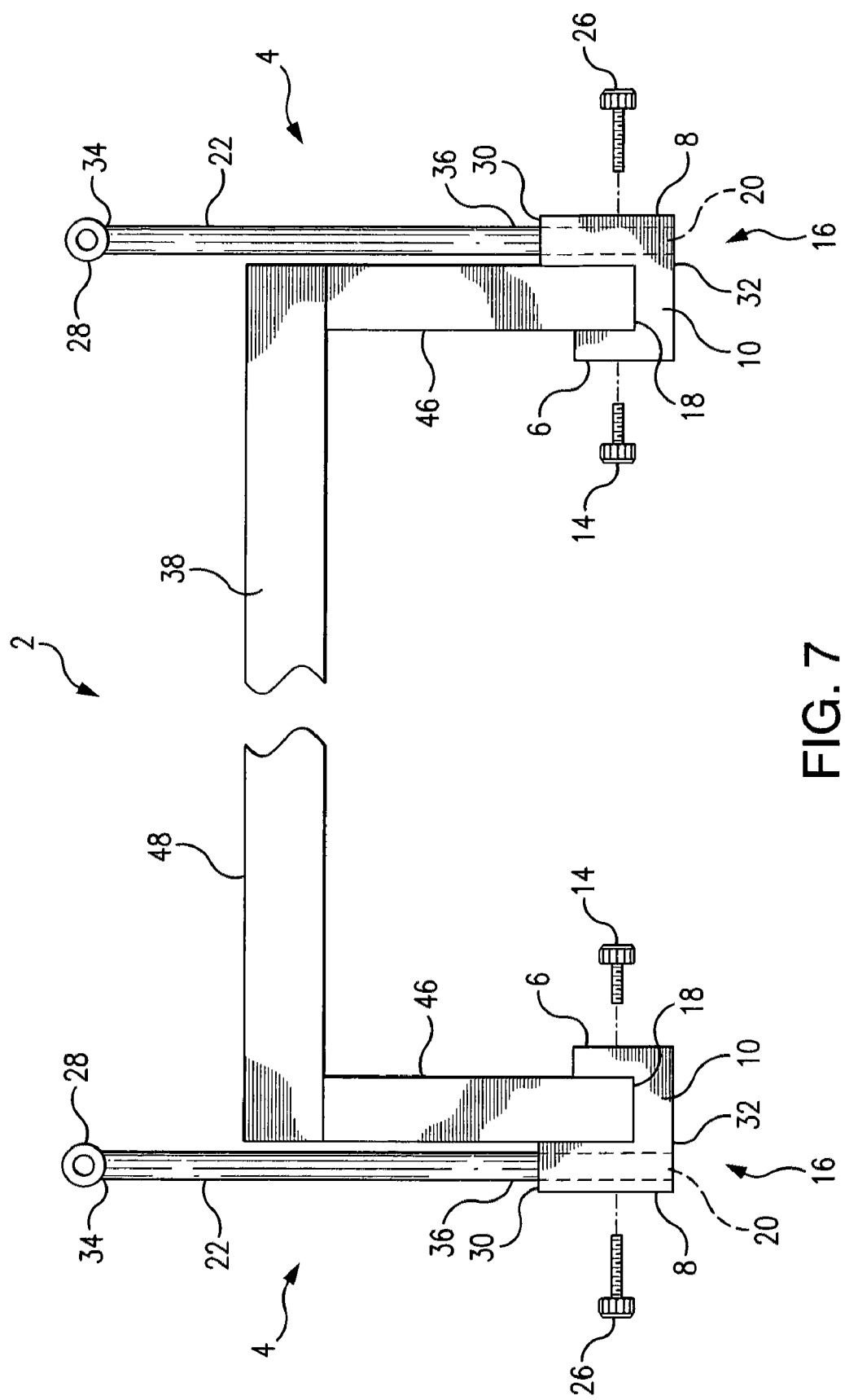
FIG. 7 is an end view of the dock section with the support arms of the bird defense system mounted thereon.

FIG. 7 is an end view of the dock 38 section with the support arms 4 of the bird defense system 2 mounted thereon. This Figure shows the relationship between the dock 38 and the bird defense system 2. The support arms 4 are attached to the stringers 46. The attachment consists of the interior open space 18 having a stringer 46 resting upon it. The support arms 4 are tightened to the stringer 46 via the first threaded fastener 14 in the first leg 6. The support rod 22 of the support arm 4 is adjustable via the second threaded fastener 26. By simply loosening the second threaded fastener 26 the height of the hollow tube 28 can be changed. Each support rod 22 slides into the large opening 20 of the second leg 8 of the U-shaped configuration 18. The near end 34 of the support rod has the hollow tube attached to it. The distal end 36 of the support rod 22 slides into the larger opening 20 of the second leg 8.

The bird defense system 2 comprises a series of the support arms 4 and a continuous cord carried by each hollow tube of each device. This cord is synonymous with any material that will make a perimeter when threaded through the hollow tubes 28 including but not limited to wire, rope, string, cord, monofilament, cable, etc.

The support arms of the device can be colored or treated metal such as powder coated, dyed, anodized or painted.

The U-shaped configuration is manufactured to fit any size stringer of an aqueous dock segment.

The support rods have adjustability and have to have a range that is at least 4 inches to 14 inches from the surface of the dock.

The support arms 4 of the bird defense system have a diameter of the large opening which is in the range of ¼ inch to ½ inch.

The device of this invention can be manufactured from, for example, plastics, or metal, or from a combination of plastics and metal. Aluminum is a preferred metal. Ethylene and propylene are preferred plastics.

What is claimed is:

1. A bird defense device, said device comprising:
   i. A base, said base having a cross member, said cross member being common to:
      a first leg, said first leg being at one end of the cross member and fixedly attached thereto;
      said first leg having a first threaded opening therethrough, said first leg having a first threaded fastener positioned in the first threaded opening;
      a second leg, said second leg being at the end of the cross member opposite the first leg, said second leg being fixedly attached to the cross member such that the cross member, first leg and the second leg form a U-shaped configuration having an interior open space;
      said second leg having a second threaded opening therethrough;
      said second leg having a large opening essentially centered through the long axis thereof, there being a support rod positioned in the large opening, said support rod being moveable through the opening and said support rod having a top end,
      said second leg having a second fastener positioned in the second threaded opening to secure the support rod therein;
      a hollow tube component fixedly attached to the top end of the support rod such that the hollow of the hollow tube is essentially perpendicular to a long axis of the support rod.

2. In combination, a bird defense system comprising a series of the devices of claim 1 and a continuous cord carried by each hollow tube of each device.

3. A device as claimed in claim 1 wherein the components are colored.

4. A device of claim 1 wherein the size of the U-shaped configuration is such that the U-shaped configuration will fit on a stringer of an aqueous dock segment.

5. The device of claim 1 wherein the length of the support rod is in the range of 4 inches to 14 inches.

6. The device of claim 1 wherein the diameter of the large opening and the support rod are in the range of ¼ inch to ½ inch.

* * * * *